United States Patent
Suh et al.

(10) Patent No.: US 12,069,698 B2
(45) Date of Patent: Aug. 20, 2024

(54) SPATIAL STREAM CONFIGURATION AND RESOURCE UNIT ALLOCATION

(71) Applicants: Jung Hoon Suh, Ottawa (CA); Osama Aboul-Magd, Ottawa (CA); Yan Xin, Ottawa (CA); Kwok Shum Au, Ottawa (CA)

(72) Inventors: Jung Hoon Suh, Ottawa (CA); Osama Aboul-Magd, Ottawa (CA); Yan Xin, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 17/334,938

(22) Filed: May 31, 2021

(65) Prior Publication Data
US 2021/0377910 A1 Dec. 2, 2021

Related U.S. Application Data

(60) Provisional application No. 63/033,143, filed on Jun. 1, 2020.

(51) Int. Cl.
*H04W 72/30* (2023.01)
*H04B 7/0452* (2017.01)
*H04B 7/06* (2006.01)
*H04W 72/044* (2023.01)
*H04W 76/11* (2018.01)
*H04W 84/12* (2009.01)

(52) U.S. Cl.
CPC .......... *H04W 72/30* (2023.01); *H04B 7/0452* (2013.01); *H04B 7/0617* (2013.01); *H04W 72/046* (2013.01); *H04W 76/11* (2018.02); *H04W 84/12* (2013.01)

(58) Field of Classification Search
CPC . H04W 72/005; H04W 76/11; H04W 72/046; H04W 84/12; H04W 28/16; H04W 72/00; H04W 8/26; H04W 16/28; H04B 7/0452; H04B 7/0617; H04L 61/00
See application file for complete search history.

(56) References Cited

U.S. PATENT DOCUMENTS

| 9,439,161 B2 | 9/2016 | Vermani et al. |
| 2011/0110454 A1* | 5/2011 | Sampath ................... H04L 1/02 375/267 |
| 2016/0205065 A1 | 7/2016 | Ghosh et al. |

(Continued)

FOREIGN PATENT DOCUMENTS

| CN | 102726103 A | 10/2012 |
| WO | 2017020174 A1 | 2/2017 |

OTHER PUBLICATIONS

Ron Porat et al., "Self Contained Signaling for E-SIG", IEEE 802.11-20/575r0.

*Primary Examiner* — Ian N Moore
*Assistant Examiner* — Latresa A McCallum

(57) ABSTRACT

In some examples, a first wireless device includes a network interface to communicate over up to 16 spatial streams in a wireless network with a plurality of wireless devices, and at least one processor configured to send a control information element that specifies, for each of a plurality of the wireless devices, a respective allocation of a minimum of two to a maximum of four spatial streams from the 16 spatial streams.

20 Claims, 6 Drawing Sheets

(56) References Cited

U.S. PATENT DOCUMENTS

| | | |
|---|---|---|
| 2018/0302847 A1 | 10/2018 | Chu et al. |
| 2019/0373586 A1* | 12/2019 | Verma .................. H04B 7/0697 |
| 2020/0112408 A1* | 4/2020 | Verma .................. H04B 7/0452 |
| 2020/0177425 A1* | 6/2020 | Chen ................... H04L 27/2602 |
| 2020/0287612 A1* | 9/2020 | Suh ...................... H04B 7/0495 |
| 2021/0045151 A1* | 2/2021 | Chen .................. H04W 74/002 |
| 2021/0136605 A1* | 5/2021 | Huang ................. H04W 24/04 |
| 2021/0376893 A1* | 12/2021 | Hu ....................... H04B 7/0617 |

* cited by examiner

| N_STA 202 | B3...B0 206 | Nsts(1) | Nsts(2) | Nsts(3) | Nsts(4) | Nsts(5) | Nsts(6) | Nsts(7) | Nsts(8) | Total N_STS 208 | Number of Entries |
|---|---|---|---|---|---|---|---|---|---|---|---|
| 2 | 0000-0010 | 2~4 | 2 | | | | | | | 4~6 | 6 |
| { 204(2) | 0011-0100 | 3~4 | 3 | | | | | | | 6~7 | |
| | 0101 | 4 | 4 | | | | | | | 8 | |
| 3 | 0000-0010 | 2~4 | 2 | 2 | | | | | | 6~8 | 10 |
| { 204(3) | 0011-0100 | 3~4 | 3 | 2 | | | | | | 8~9 | |
| | 0101 | 4 | 4 | 2 | | | | | | 10 | |
| | 0110-0111 | 3~4 | 3 | 3 | | | | | | 9~10 | |
| | 1000 | 4 | 4 | 3 | | | | | | 11 | |
| | 1001 | 4 | 4 | 4 | | | | | | 12 | |
| 4 | 0000-0010 | 2~4 | 2 | 2 | 2 | | | | | 8~10 | 15 |
| { 204(4) | 0011-0100 | 3~4 | 3 | 2 | 2 | | | | | 10~11 | |
| | 0101 | 4 | 4 | 2 | 2 | | | | | 12 | |
| | 0110-0111 | 3~4 | 3 | 3 | 2 | | | | | 11~12 | |
| | 1000 | 4 | 4 | 3 | 2 | | | | | 13 | |
| | 1001 | 4 | 4 | 4 | 2 | | | | | 14 | |
| | 1010-1011 | 3~4 | 3 | 3 | 3 | | | | | 12~13 | |
| | 1100 | 4 | 4 | 3 | 3 | | | | | 14 | |
| | 1101 | 4 | 4 | 4 | 3 | | | | | 15 | |
| | 1110 | 4 | 4 | 4 | 4 | | | | | 16 | |

FIG. 2A

| N_STA 202 | B3...B0 206 | Nsts(1) | Nsts(2) | Nsts(3) | Nsts(4) | Nsts(5) | Nsts(6) | Nsts(7) | Nsts(8) | Total N_STS 208 | Number of Entries |
|---|---|---|---|---|---|---|---|---|---|---|---|
| 5 (204(5)) | 0000-0010 | 2~4 | 2 | 2 | 2 | 2 | | | | 10~12 | 15 |
| | 0011-0100 | 3~4 | 3 | 2 | 2 | 2 | | | | 12~13 | |
| | 0101 | 4 | 4 | 2 | 2 | 2 | | | | 14 | |
| | 0110-0111 | 3~4 | 3 | 3 | 2 | 2 | | | | 13~14 | |
| | 1000 | 4 | 4 | 3 | 2 | 2 | | | | 15 | |
| | 1001 | 4 | 4 | 4 | 2 | 2 | | | | 16 | |
| | 1010-1011 | 3~4 | 3 | 3 | 3 | 2 | | | | 14~15 | |
| | 1100 | 4 | 4 | 3 | 3 | 2 | | | | 16 | |
| | 1101-1110 | 3~4 | 3 | 3 | 3 | 3 | | | | 15~16 | |
| 6 (204(6)) | 0000-0010 | 2~4 | 2 | 2 | 2 | 2 | 2 | | | 12~14 | 7 |
| | 0011-0100 | 3~4 | 3 | 2 | 2 | 2 | 2 | | | 14~15 | |
| | 0101 | 4 | 4 | 2 | 2 | 2 | 2 | | | 16 | |
| | 0110 | 3 | 3 | 3 | 3 | 2 | 2 | | | 16 | |
| 7 (204(7)) | 0000-0010 | 2~4 | 2 | 2 | 2 | 2 | 2 | 2 | | 14~16 | 4 |
| | 0011 | 3 | 3 | 2 | 2 | 2 | 2 | 2 | | 16 | |
| 8 (204(8)) | 0000 | 2 | 2 | 2 | 2 | 2 | 2 | 2 | 2 | 16 | 1 |

FIG. 2B

SPATIAL STREAM CONFIGURATION AND RESOURCE UNIT ALLOCATION

RELATED APPLICATIONS

This application claims benefit and priority to U.S. Provisional Patent application No. 63/033,143 filed Jun. 1, 2020, the contents of which are incorporated herein by reference.

BACKGROUND

A goal of successive generations of radio frequency communications systems is to apply techniques that can increase the amount of information transmitted using communication resources as compared to prior techniques. In some examples, multiple-input and multiple-output (MIMO) communications can be employed. A MIMO communication refers to a wireless communication in which multiple signals can be transmitted over one or more transmission resources by exploiting multipath propagation. The multipath propagation uses multiple spatial streams that carry respective signals over the transmission resource.

In some cases, the number of spatial streams that can be used in a wireless network can be restricted, such as by a governing wireless communication standard. Restricting the number of spatial streams can result in the wireless network having a wireless communication resource that may not support demands of wireless devices.

SUMMARY

According to aspects of the present disclosure, a wireless network that supports multi-user multiple-input and multiple-output (MU-MIMO) communications can support up to 16 spatial streams for communicating with multiple wireless devices, with each wireless device using at least 2 of the spatial streams.

According to an aspect of the present disclosure, there is provided an a first wireless device that includes a network interface to communicate using up to 16 spatial streams in a wireless network with wireless devices; and at least one processor operatively connected to the network interface and configured to send a control information element that specifies, for each of a plurality of the wireless devices, a respective allocation of a minimum of two to a maximum of four spatial streams from the 16 spatial streams.

In some examples of the preceding aspect, the control information element includes, for each of the plurality of the wireless devices: a resource unit allocation indicator that indicates a resource unit allocation for the wireless device, and a spatial stream allocation indicator that indicates a number of the spatial streams allocated to the wireless device.

In at least some examples of the preceding aspects, the control information element includes, for each of the plurality of the wireless devices, a respective user specific field, the user specific field for each wireless device comprising: a wireless device identifier that identifies the wireless device, the resource unit allocation indicator for the wireless device, and the spatial stream allocation indicator for the wireless device.

In at least some examples of the preceding aspects, the spatial stream allocation indicator has a length of 2 bits.

In at least some examples of the preceding aspects, the control information element includes, for each of the plurality of the wireless devices: a 4-bit index that maps to a respective spatial configuration, and wherein different values of the 4-bit index map to different spatial configurations that correspond to different allocations of spatial streams.

In at least some examples of the preceding aspects, the first wireless device includes a non-transitory storage medium to store a spatial configuration table, wherein the spatial configurations are represented by different entries of the spatial configuration table.

In at least some examples of the preceding aspects the control information element is part of a preamble of a physical data unit.

In at least some examples of the preceding aspects, the control information element is part of a signal (SIG) field in a physical header of a wireless local area network (WLAN) frame.

In at least some examples of the preceding aspects, the first wireless device is an access point (AP).

In at least some examples of the preceding aspects, the network interface is configured to perform multi-user multiple-input and multiple-output (MU-MIMO) communications using up to the 16 spatial streams.

In at least some examples of the preceding aspects, the control information element includes a common field that includes a resource unit allocation indicator that indicates a resource unit allocation for the plurality of wireless devices and a device number indicator that indicates the number of the plurality of wireless devices; and the control information element includes, for each of the wireless devices, a respective device specific field that includes a spatial stream allocation indicator for the wireless device.

In at least some examples of the preceding aspects, the spatial stream allocation indicator indicates a number of spatial streams allocated for the wireless device.

In at least some examples of the preceding aspects the spatial stream allocation indicator has a length of 2 bits.

According to a second aspect of the present disclosure is a method of a first wireless device comprising: communicating with up to four wireless devices using up to 16 spatial streams in a wireless network, wherein each of the wireless devices is allocated a minimum of two to a maximum of four spatial streams; and sending a control information element that specifies, for each of a plurality of the wireless devices, a respective allocation of a minimum of two to a maximum of four spatial streams from the 16 spatial streams.

According to a third aspect of this disclosure, there is provided a first wireless device comprising: a network interface to communicate with a second wireless device in a wireless network, the second wireless device supporting wireless communication over a plurality of spatial streams with a plurality of wireless devices, wherein a number of spatial streams of the plurality of spatial streams is up to 16, and wherein the plurality of wireless devices are each allocated a minimum of two to a maximum of four of the spatial streams, and at least one processor configured to receive through the network interface, from the second wireless device, a control information element that specifies, for each of the plurality of the wireless devices, a respective allocation of two to four spatial streams from the plurality of spatial streams.

According to a further example of the third aspect, the control information element includes, for each of the plurality of the wireless devices: a resource unit allocation indicator that indicates a resource unit allocation for the wireless device, and a spatial stream allocation indicator that indicates a number of the spatial streams allocated to the wireless device.

According to one or more of the preceding examples of the third aspect, the control information element includes, for each of the plurality of the wireless devices, a respective user specific field, the user specific field for each wireless device comprising: a wireless device identifier that identifies the wireless device, the resource unit allocation indicator for the wireless device, and the spatial stream allocation indicator for the wireless device.

According to one or more of the preceding examples of the third aspect the spatial stream allocation indicator has a length of 2 bits.

According to one or more of the preceding examples of the third aspect the at least one processor is configured to determine, based on the user specific fields, the spatial stream allocation for the first wireless device.

According to one or more of the preceding examples of the third aspect, control information element comprises, for each of the plurality of wireless devices, a respective value selected from a plurality of values that correspond to different allocations of spatial streams of the plurality of spatial streams to the plurality of wireless devices, and the respective values in the control information element each comprise a value of a four-bit index that maps to a respective spatial configuration, and wherein different values of the four-bit index map to different spatial configurations that correspond to the different allocations of spatial streams.

According to one or more of the preceding examples of the third aspect, the first wireless device further comprises: a non-transitory storage medium to store a spatial configuration table, wherein the spatial configurations are represented by different entries of the spatial configuration table.

According to one or more of the preceding examples of the third aspect, the control information element is part of a signal (SIG) field in a physical header of a wireless local area network (WLAN) frame.

According to a fourth aspect of the present disclosure, there is provided a method of a first wireless device, comprising: communicating with a second wireless device in a wireless network, the second wireless device supporting wireless communication over a plurality of spatial streams with a plurality of wireless devices, wherein a number of spatial streams of the plurality of spatial streams is up to 16, and wherein a wireless device is allocated a minimum of 2 to a maximum of four spatial streams; and receiving, from the second wireless device, a control information element that specifies, for each of the plurality of the wireless devices, a respective allocation of two to four spatial streams from the plurality of spatial streams.

According to an example of the fourth aspect, the control information element includes, for each of the plurality of the wireless devices, a respective user specific field, the user specific field for each wireless device comprising: a wireless device identifier that identifies the wireless device, the resource unit allocation indicator for the wireless device, and the spatial stream allocation indicator for the wireless device.

According to one or more of the preceding examples of the fourth aspect, the spatial stream allocation indicator has a length of 2 bits.

According to one or more of the preceding examples of the fourth aspect, the control information element comprises a value selected from a plurality of values that correspond to different allocations of spatial streams of the plurality of spatial streams to the plurality of wireless devices.

According to one or more of the preceding examples of the fourth aspect, the value in the control information element comprises a value of a four-bit index that maps to a respective spatial configuration, and wherein different values of the four-bit index map to different spatial configurations that correspond to the different allocations of spatial streams.

BRIEF DESCRIPTION OF THE DRAWINGS

Some implementations of the present disclosure are described with respect to the following figures.

FIGS. 2A-2B illustrate an example spatial configuration table, according to some implementations.

Figure 1:
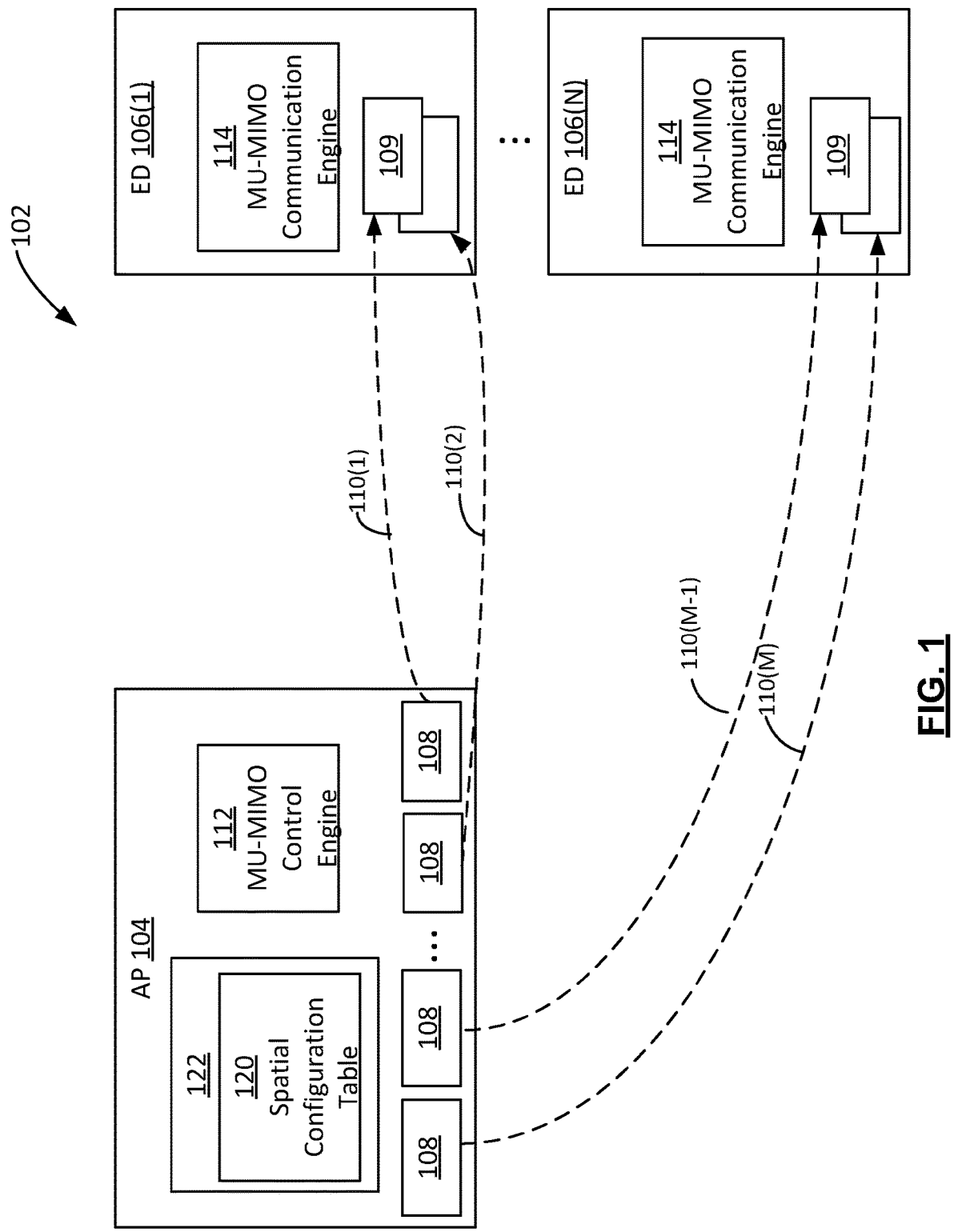
FIG. 1 is a block diagram of an example wireless arrangement that includes wireless devices capable of communications in spatial streams, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Multi-user multiple-input and multiple-output (MU-MIMO) refers to a wireless communication technology that supports wireless communication among multiple wireless devices using multiple spatial streams. The spatial streams are spatially distributed from one another. A source wireless device can transmit signals in the spatial streams to multiple recipient wireless devices. The different spatial streams can carry information that is modulated or coded differently. For example, the information carried in a first spatial stream is modulated or coded differently than information in a second spatial stream.

The throughput available for wireless communications using the spatial streams depends on the number of spatial streams that can be used for wireless communications. The Institute of Electrical and Electronics Engineers (IEEE) 802.11ax standard supports an MU-MIMO spatial configuration that allows for up to eight spatial streams to be used. Restricting the number of spatial streams to eight for MU-MIMO communications may result in a wireless network not being able to meet communication demands of wireless devices, as the number of wireless devices that are able to communicate in the wireless network continues to grow. It is contemplated that future standards will support an MU-MIMO spatial configuration of greater than eight spatial streams, for example up to 16 spatial streams. Furthermore, in future networks, all end-user wireless devices will be enabled to support at least two spatial streams.

Spatial stream allocation tables may be used to specify the allocation of spatial streams to multiple stations in a MU-MIMO allocation. The goal of a spatial stream allocation table is to save communication overhead by minimizing the amount of information that must be transmitted to completely specify the spatial streams allocated to each STA in a MU-MIMO allocation. The greater the number of possible permutations of streams assigned to STAs, the larger the spatial allocation table, the more storage space it occupies, and the greater the number of bits required to index into such a table.

With SU-MIMO being introduced in 802.11n and MU-MIMO becoming commonplace in 802.11ac basic service sets, a greater proportion of user equipment is configured to comprise multiple antennas to take advantage of the greater bandwidth provided by MU-MIMO. The situation may arise in which every user equipment in a BSS has multiple antennas. In this case, the allocation of a single stream to a UE may become suboptimal and thus rare. It may become inefficient to provide in spatial configuration tables many options for allocating a single stream to a STA. It is desired to reduce the overhead consumed by spatial allocation tables and streamline them for the most common use cases as UE evolves to utilize multiple antennas.

In accordance with some implementations of the present disclosure, an MU-MIMO spatial configuration is provided that supports up to 16 spatial streams for wireless communications, with at least 2 spatial streams allocated per MU-MIMO scheduled wireless device. FIG. 1 is a block diagram of an example wireless arrangement that includes multiple wireless devices, including an access point (AP) 104 and various electronic devices 106(1) to 106(N). Access point (AP) 104 is able to communicate with electronic devices 106(1) to 106(N) (referred to generically as electronic device 106 in the singular), N≥2, in a wireless network 102. The AP 104 and the electronic devices 106(1) to 106(N) are examples of wireless devices that are able to perform wireless communications.

In some examples, the AP 104 and electronic devices 106(1) to 106(N) are able to communicate according to the Institute of Electrical and Electronic Engineers (IEEE) 802.11 group of standards. In such examples, the wireless network 102 is referred to as a wireless local area network (WLAN), and the electronic devices 106(1) to 106(N) referred to as stations (STAs).

In other examples, the AP 104 and electronic devices 106(1) to 106(N) can communicate according to other standards, such as wireless standards including a Long-Term Evolution (LTE) standard as promulgated by the Third Generation Partnership Project (3GPP). In further examples, a wireless standard can include a Fifth Generation (5G) wireless standard. In a wireless network, an AP is referred to as a base station, such as an Evolved NodeB (eNB) for LTE.

Although just one AP 104 is shown in FIG. 1, it is noted that the wireless network 102 can include multiple APs that define respective coverage areas for communicating with electronic devices.

Examples of the electronic devices 106(1) to 106(N) include any or some combination of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), a vehicle, server computers, storage devices, communication nodes, and so forth.

The AP 104 includes multiple transceivers 108 that are able to communicate with the electronic devices 106(1) to 106(N) over corresponding spatial streams 110(1), 110(2), . . . , 110 (M−1), 110(M). Generally, M is greater than or equal to 4, and any scheduled electronic device 106 will be allocated at least two of the spatial streams. In the example of FIG. 1, the AP 104 communicates over multiple spatial streams 110(1) and 110(2) with respective transceivers 109 of the electronic device 106(1). The AP 104 communicates over multiple spatial streams 110(M−1) and 110(M) with respective transceivers 109 of the electronic device 106(N). A "transceiver" includes a transmitter to transmit wireless signals, and a receiver to receive wireless signals. The transceiver can include an antenna and associated amplification and modulation/demodulation circuitry. Each electronic device 106(1) to 106(N) includes two or more transceivers 109.

In some examples, communications in the wireless network 102 between the AP 104 and the electronic devices 106(1) to 106(N) can employ orthogonal frequency-division multiple access (OFDMA) channels. According to some wireless standards, such as the IEEE 802.11ax standard, an OFDMA channel is subdivided into multiple resource units (RUs). The different RUs of an OFDMA channel include subcarriers of different frequencies. Each RU is a subchannel of the OFDMA channel. Although reference is made to IEEE 802.11ax, it is noted that techniques or mechanisms according to some implementations of the present disclosure can be used in conjunction with other standards, including future generations of the IEEE 802.11 standards or different standards.

In examples in which OFDMA RUs are used, the AP 104 can schedule MU-MIMO communications on one or more RUs. In other examples, MU-MIMO can be scheduled on other types of wireless transmission resources.

In accordance with some implementations of the present disclosure, the AP 104 is able to use an MU-MIMO spatial configuration that supports wireless communications with electronic devices over up to a maximum of 16 spatial streams. The AP 104 is able to schedule a minimum of two and up to a maximum of four spatial streams for wireless communication with each electronic device 106. Stated differently, the number of spatial streams used by the AP 104 for communicating with an individual electronic device 106 will be at least two spatial streams but will not exceed four spatial streams. Restricting the number of spatial streams that can be used with an individual electronic device to between two and four spatial streams may in some applications allow for improved MU-MIMO communication performance as compared to examples where less than two or more than four spatial streams can be scheduled for an individual electronic device 106.

The AP 104 includes an MU-MIMO control engine 112 that is able to control the scheduling of spatial streams for use with a collection of electronic devices. Each electronic device 106(1) to 106(N) includes a respective MU-MIMO communication engine 114 that is able to interact with the MU-MIMO control engine 112 for performing MU-MIMO communications with the AP 104 over spatial streams allocated to the respective electronic device 106(1) to 106(N).

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The MU-MIMO control engine 112 is able to send a control information element to each respective electronic device 106(1) to 106(N) for controlling an allocation of two or more spatial streams to the electronic device 106(1) to 106(N). An "information element" can refer to a message, a portion of a message, or any other collection of information. The control information element can also include multiple portions (e.g., fields) of a message, or multiple messages. The control information element can be broadcast or multicast by the AP 104 to multiple electronic devices. Alternatively, in some examples, the control information element can be unicast by the AP 104 to an individual electronic device.

The MU-MIMO communication engine 114 in each respective electronic device 106 can receive the control information element, and determine an allocation of spatial streams for the electronic device 106 based on the control information element. Note that the allocated spatial streams for an electronic device 106 can include a minimum of two spatial streams and up to a maximum of four spatial streams.

In example embodiments, the MU-MIMO control engine 112 of AP 104 is configured to allocate spatial streams based on predetermined allocation rules that are defined by a spatial configuration table 120 that is stored in a storage medium 122 of the AP 104. The storage medium 122 of the AP 104 can include any or some combination of a disk-based storage device, a solid state drive, a memory device, and so forth.

An example of a spatial configuration table 120 according to some implementations of the present disclosure is shown in FIGS. 2A-2B. In the spatial configuration table 120, an N_STA column 202 includes a value (e.g., 2 to 8) specifying the number of electronic devices being scheduled for MU-MIMO communications. Spatial configuration table 120 provides rules for spatial stream allocation in respect of an RU for scenarios where number M of spatial streams is up to 16 (i.e., M<=16), the number N of electronic devices is between two and eight (i.e., 2<=N<=8) and the number of spatial streams Nsts allocated per electronic device per RU is between two and four (i.e., 2<=Nsts(i)<=4, where 1=i<=8). Different values of N_STA map to different spatial configuration table parts (204(2) to 204(8)) of the spatial configuration table 120. The spatial configuration table part 204(2) of the spatial configuration table 120 contains entries for a scenario in which two electronic devices are scheduled for MU-MIMO communications, the spatial configuration table part 204(3) of the spatial configuration table 120 contains entries for a scenario in which three electronic devices are scheduled for MU-MIMO communications, the spatial configuration table part 204(4) of the spatial configuration table 120 contains entries for a scenario in which four electronic devices are scheduled for MU-MIMO communications, and so forth, up to the spatial configuration table part 204(8) of the spatial configuration table 120 that contains entries for a scenario in which 8 electronic devices are scheduled for MU-MIMO communications.

A spatial configuration index column 206 includes different values of a spatial configuration index, implemented with four bits B3, B2, B1, B0.

An Nsts(1) column specifies the number of spatial streams (Nsts) allocated to electronic device 106(1), an Nsts(2) column specifies the number of spatial streams allocated to electronic device 106(2), an Nsts(3) specifies the number of spatial streams allocated to electronic device 106(3), and so forth, up to an Nsts(8) column, which specifies the number of spatial streams allocated to electronic device 106(8). Note that a blank in a given Nsts(i) column indicates that the allocation of spatial streams in the corresponding entry of the spatial configuration table 120 does not apply to the corresponding electronic device 106(i) (i=1 to 8).

A Total N_STS column 208 of the spatial configuration table 120 indicates a total number of spatial streams allocated to MU-MIMO scheduled electronic devices. A Number of Entries column specifies the number of entries present in the respective part of the spatial configuration table 120. For example, the Number of Entries value for the spatial configuration table part 204(2) is 6, which indicates that the spatial configuration table part 204(2) includes 6 entries corresponding to 6 possible values (0000 to 0101) of the spatial configuration index included in the index column 206.

In the spatial configuration table part 204(2) corresponding to N_STA=2, the range of index values of the spatial configuration index is 0000 to 0101.

The three possible values (0000, 0001, and 0010) in the spatial configuration index range of 0000-0010 correspond to respective different numbers of spatial streams allocated to electronic device 106(1). For example, if the spatial configuration index is set to 0000, and N_STA=2, then the number of spatial streams allocated to electronic device 106(1) in the Nsts(1) column is 2 and the number of spatial streams allocated to electronic device 106(2) in the Nsts(2) column is 2 (note that in this entry of the spatial configuration table 120, the other electronic devices 3 to 16 are not allocated any spatial streams). If the spatial configuration index is set to 0001 and the N_STA=2, then the number of spatial streams allocated to electronic device 106(1) in the Nsts(1) column is 3 and the number of spatial streams allocated to electronic device 106(2) in the Nsts(2) column is 2 (note that in this entry of the spatial configuration table 120, the other electronic devices 106(3) to 106(8) are not allocated any spatial streams). If the spatial configuration index is set to 0010 and N_STA=2, then the number of spatial streams allocated to electronic device 106(1) in the Nsts(1) column is 4 and the number of spatial streams allocated to electronic device 106(2) in the Nsts(2) column is 2 (note that in this entry of the spatial configuration table 120, the other electronic devices 106(3) to 106(8) are not allocated any spatial streams).

If the spatial configuration index is set to 0011 and N_STA=2, then the number of spatial streams allocated to electronic device 106(1) in the Nsts(1) column is 3 and the number of spatial streams allocated to electronic device 106(2) in the Nsts(2) column is 3 (note that in this entry of the spatial configuration table 120, the other electronic devices 106(3) to 106(8) are not allocated any spatial streams). If the spatial configuration index is set to 0100 and N_STA=2, then the number of spatial streams allocated to electronic device 106(1) in the Nsts(1) column is 4 and the number of spatial streams allocated to electronic device 106(2) in the Nsts(2) column is 3 (note that in this entry of the spatial configuration table 120, the other electronic devices 106(3) to 106(8) are not allocated any spatial streams).

The other entries of the spatial configuration table part 204(2) are construed similarly.

In another example, for N_STA=4 (which maps to the spatial configuration table part 204(4)), if the spatial configuration index is set to 0111, then the number of spatial streams allocated to electronic device 106(1) in the Nsts(1) column is 4, the number of spatial streams allocated to electronic device 106(2) in the Nsts(2) column is 3, the number of spatial streams allocated to electronic device 106(3) in the Nsts(3) column is 3, and the number of spatial streams allocated to electronic device 106(4) in the Nsts(4) column is 2 (note that in this entry of the spatial configuration table 120, the other electronic devices 106(5) to 106(8) are not allocated any spatial streams).

The remainder of the spatial configuration table 120 is construed similarly.

Accordingly, in the example spatial configuration table 120 of FIGS. 2A, 2B, certain combinations of N_STA values and spatial configuration index values map to spatial configurations in which four to 16 spatial streams are allocated among electronic devices. Each electronic device 106 that is allocated spatial streams is allocated between 2 and 4 spatial streams.

In some implementations of the present disclosure, the spatial configuration index is four bits in length, which allows up to 16 different spatial allocation combinations to be specified. For example, the four bit spatial configuration index allows 15 different spatial stream allocation possibilities in each of configuration table parts 204(4) (i.e. N_STA=4) and 204(5) (i.e. N_STA=5) to be specified once the number N_STA of electronic devices is known.

As noted above, the MU-MIMO control engine 112 of AP 104 is configured to send a control information element to participating electronic devices 106(1) to 106(N) for controlling allocation of two or more spatial streams to each of the electronic devices 106(1) to 106(N). The MU-MIMO communication engine 114 of each electronic device 106(1) to 106(N) participating in the MU-MIMO communications is configured to determine its respective allocation of spatial streams based on the control information element received from AP 104.

Two different example embodiments of a control information element and its processing are described below. In one example embodiment, the control information element is self-contained, meaning that the MU-MIMO communication engine 114 of a receiving electronic device 106 can determine its spatial stream allocation based on the information included within user specific fields of the control information element 300 and without requiring access to a locally stored version of the spatial configuration table 120. In another example embodiment, the control information element is not self-contained.

Self-Contained Control Information Element

Figure 3:
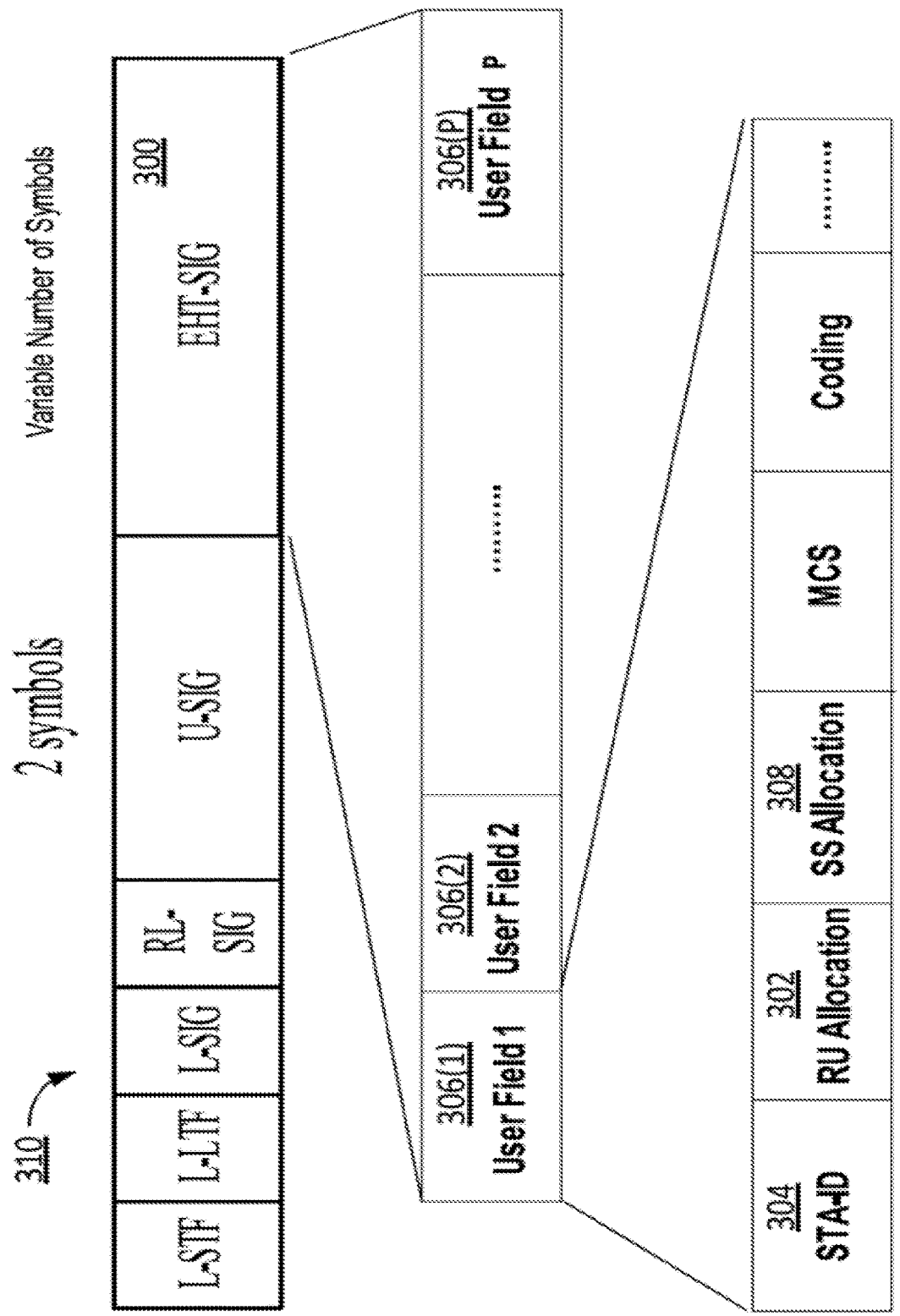
FIG. 3 is a block diagram of a control information element, according to some examples.

FIG. 3 illustrates an example control information element 300. In some examples, the control information element 300 can be in the form of a signal (SIG) field in a physical (PHY) header 310 of a WLAN frame. In other examples, the control information element 300 can be part of a different field or different message (or part of multiple fields or messages). For example, the control information element 300 can be part of the preamble of a physical data unit. In the example of FIG. 3, the control information element 300 is in the form of an extreme high throughput signal (EHT-SIG) field of a physical (PHY) header 310 of a physical data unit.

The control information element 300 is self-contained, meaning that the MU-MIMO communication engine 114 of a receiving electronic device 106 can determine its spatial stream allocation based on the information included within the user specific fields 306(1) to 305(P) of control information element 300 without requiring access to a locally stored version of the spatial configuration table 120.

In an example embodiment, the control information element 300 includes one or more user-specific fields 306(1) to 306(P) (referred to generically in the singular as user specific field 306). Each user-specific field 306 includes information specific to a respective individual electronic device 106. Each user-specific field 306(1) to 306(P) includes respective fields for: a device identifier 304 (such as a station or STA identifier) to identify the respective electronic device 106; an RU allocation indicator 302, indicating an RU allocation for the electronic device 106, a SS allocation indicator 308 indicating the number of spatial streams Nsts allocated for the electronic device 106, and MCS and coding indicators, indicating the modulation and coding scheme (MCS) and coding that the electronic device 106 is to use to decode or encode information sent using the allocated spatial streams. The user-specific fields 306(1) to 306(P) can include further information in further examples. In some examples, multiple user specific fields can be included per electronic device 106.

The information included in control information element 300 indicates a spatial stream allocation for each electronic device 106(1) to 106(N) participating in a scheduled MU-MIMO communication as follows. Accordingly, the number of user-specific fields 306 in control information element 300 that each indicate the same RU allocation will correspond to the number of electronic devices 106(1) to 106(N) that are participating in a MU-MIMO communication using the same RU. In example embodiments, the spatial streams are sequentially allocated in an order that corresponds to the order of the user-specific fields 306(1) to 306(P) within the control information element 300, and the SS allocation indicator 308 included in the user-specific field 306 for a specific electronic device 106 indicates the number of spatial streams allocated to that specific electronic device 106.

The MU-MIMO communication engine 114 of a receiving electronic device 106 can identify the first spatial stream allocated to that receiving device 106 in the sequence of spatial streams by determining the number of spatial streams that have already been allocated in respect of the same RU in the user-specific fields included in the control information element 300 prior to the user-specific field 306 addressed to that electronic device 106. The MU-MIMO communication engine 114 of the receiving electronic device 106 can then identify the remainder of the spatial stream(s) allocated to it based on the number indicated in the SS allocation indicator 308 of the user-specific field 306.

Accordingly, for the case where the number of spatial streams per electronic device is between 2 and 4, only 2 bits are required for SS allocation indicator 308. For example "00" can indicate the number of allocated spatial streams for the identified electronic device 106 is 2, "01" can indicate the number of spatial streams is 3, and "10" can indicate the number of spatial streams is 4. The starting stream and ending stream do not have to be explicitly identified by the SS allocation indicator 308.

By way of example, with reference to spatial configuration table 120, in the specific case a spatial stream allocation index "1001" for N_STA=3, the SS allocation indicator 308 in binary in each of the respective user-specific fields 306(1), 306(2) 306(3) for each of the three electronic devices 106(1), 106(2) and 106(3) having the same RU allocation will be "10", "10, "10" (where "10" indicates 4 spatial streams). Based on that information, an electronic device 106(3) will determine that the first 8 spatial steams have already been allocated and its spatial stream allocation is spatial streams 9 to 12.

Figure 4:
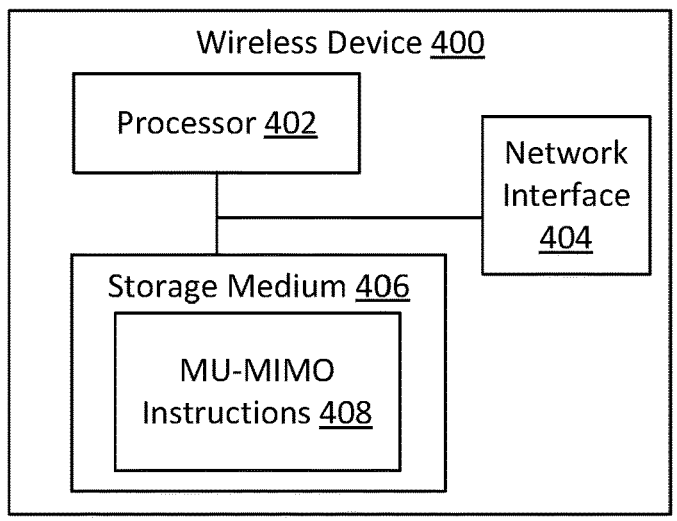
FIG. 4 is a block diagram of a processing unit that may be used to implement a wireless device according to some implementations of the present disclosure.

FIG. 4 is a block diagram of a wireless device 400, which can be the AP 104 of FIG. 1 or an electronic device 106 of FIG. 1. The wireless device 400 includes one or more hardware processors 402. A hardware processor can include a microprocessor, a core of a multi-core microprocessor, a microcontroller, a programmable integrated circuit, a programmable gate array, a digital signal processor, or another hardware processing circuit.

The wireless device 400 further includes a network interface 404 to communicate over a wireless network (e.g., 102 in FIG. 1). The network interface 404 includes transceivers and network protocol layers to allow for communications over the wireless network. In the case of an AP 104, network interface 404 includes transceivers 108, and in the case of an electronic device 106 network interface 404 includes transceivers 109.

The wireless device 400 also includes a non-transitory machine-readable or computer-readable storage medium 406 that stores machine-readable instructions executable on the one or more hardware processors 402 to perform respective tasks.

The machine-readable instructions include MU-MIMO-related instructions 408, which upon execution on the one or more hardware processors 402 can perform the tasks of the MU-MIMO control engine 112 of FIG. 1, or the tasks of the MU-MIMO communication engine 114 of FIG. 1.

For example, the MU-MIMO-related instructions 408 can send a control information element 300 that indicates a number of wireless devices having a same RU allocation, and the number of spatial streams within a set of spatial streams allocated to each of the electronic devices in respect of the RU. Each wireless device is allocated between two and four spatial streams.

Figure 5:
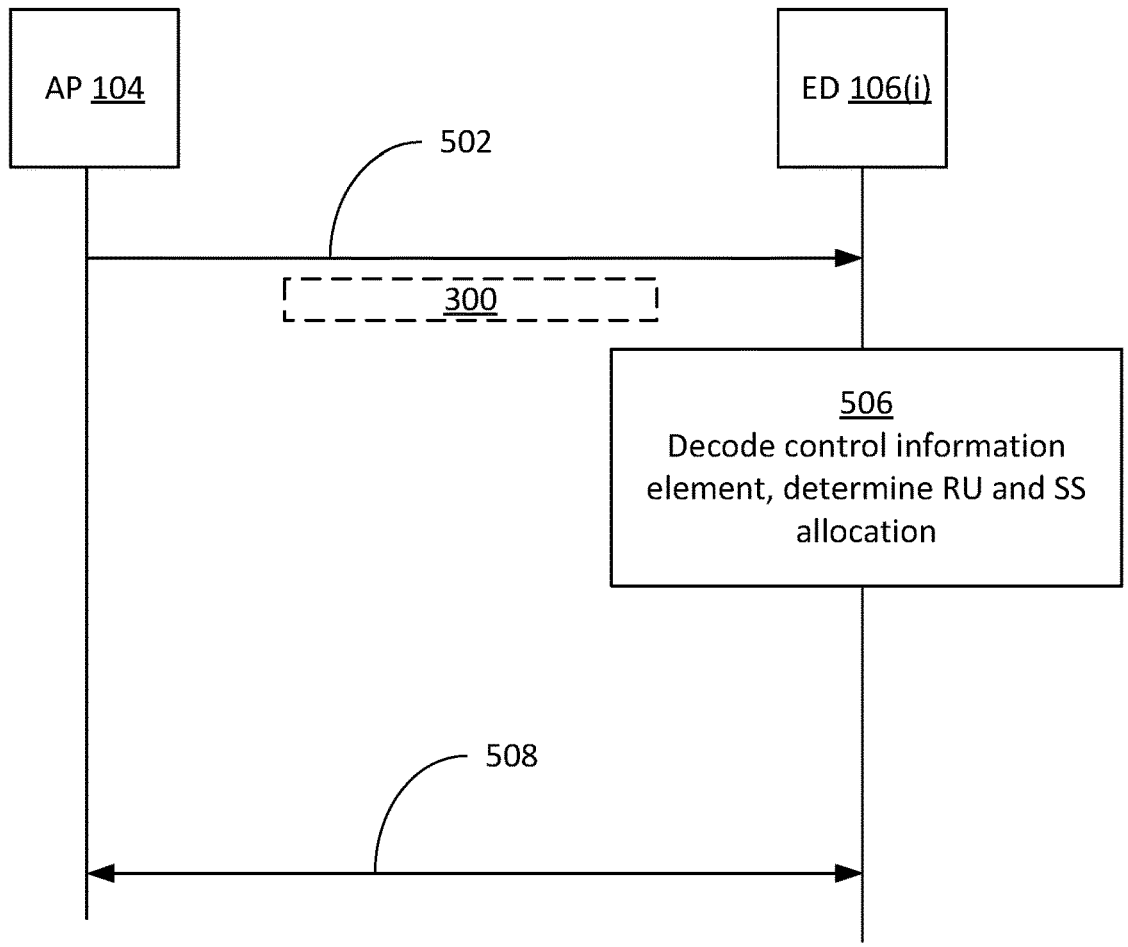
FIG. 5 is a message flow diagram of a process according to some implementations of the present disclosure.

FIG. 5 is a flow diagram of a process that can be performed by the AP 104 and an electronic device 106($i$), which is one of the electronic devices 106(1) to 106(N), according to some examples. The AP 104 transmits (at 502) a control information element 300 that includes, in a successive transmission order, user specific fields 306(1) to 306(P). The user specific fields 306(1) to 306(P) each include a respective electronic device identifier 304, RU allocation indicator 302, and spatial stream allocation indicator 308 that indicates the number of spatial streams that have been allocated for the identified electronic device. Electronic devices 106(1) to 106(N) have been selected by the MU-MIMO control engine 112 of AP 104 to participate in a MU-MIMO communication that uses the same RU. Accordingly, included among user specific fields 306(1) to 306(P) are N user specific fields 306 that each have the same RU allocation indicator 302 and correspond to respective electronic devices 106(1) to (N).

As indicated at block 506, in response to receiving the control information element 300, a receiving electronic device 106($i$) (which is one of the electronic devices 106(1) to (N)) decodes the control information element 300 to identify, based on the electronic device identifiers 304 included in the respective user specific fields, the user specific field 306($j$), $1<=j<=P$, that identifies electronic device 106($i$). By decoding its own user specific field 306($j$), the electronic device 106($i$) can determine: (i) its own RU allocation as indicated by RU allocation indicator 302; and (ii) the number Nsts of spatial steams that have been allocated to it, as indicated in SS allocation indicator 308. Furthermore, by decoding any user specific fields 306(1) to 306($j$–1) included in the control information element 300 that precede its own user specific field 306($j$), the electronic device 106($i$) can determine how many electronic devices 106 having the same RU allocation have already been allocated spatial streams in the control information element 300, and the number of spatial streams allocated to each of those other electronic devices 106. Based on this information, the MU-MIMO communication engine 114 of electronic device 106($i$) can determine the starting and ending spatial streams that have been allocated to electronic device 106($i$) within the set of 16 possible spatial streams.

The MU-MIMO communication engine 114 configures electronic device 106($i$) to use the allocated spatial streams (e.g., 2 to 4 streams) to communicate (at 508) with the AP 104. For example, the electronic device 106 receives information in the allocated spatial streams from the AP 104.

Non-Self-Contained Control Information Element

Figure 6:
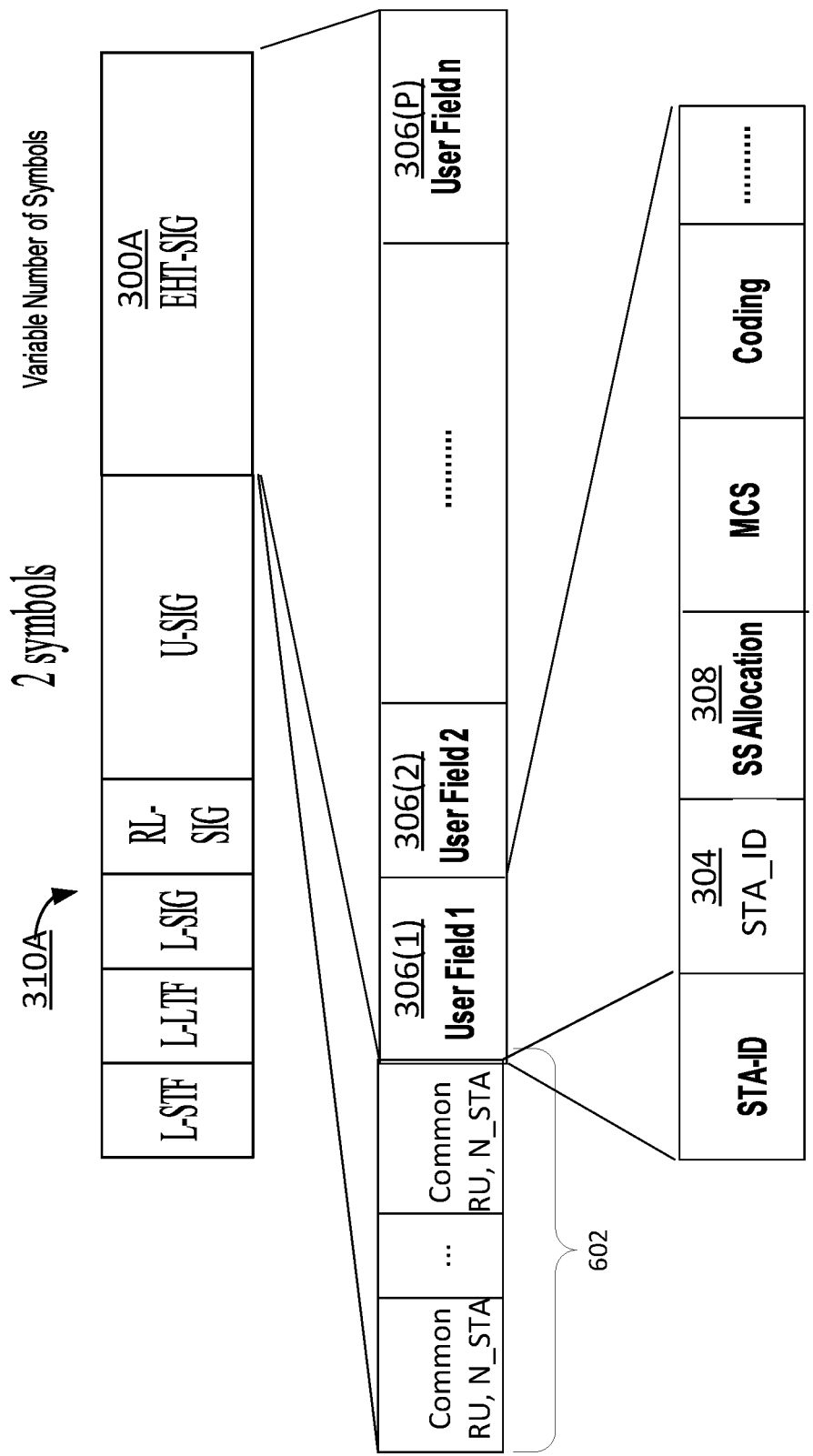
FIG. 6 is a block diagram of a further example of a control information element, according to some examples.

In a further example embodiment, the control information element is not self-contained, and in such cases the control information element includes additional information than described above in respect of the self-contained control information element 300. In this regard, FIG. 6 illustrates an example of a physical header 310A of a WLAN frame according to a further example embodiment. The control information element 300A (e.g. EHT-SIG filed in the illustrated examples) of physical header 310A includes an additional field, namely a common field 602, that precedes the user specific fields 306(1) to 306(P). The common field 602 includes respective fields for an RU allocation indicator (RU) that specifies an RU allocation and a device number (N_STA) indicator that specifies the number of wireless devices in the MU-MIMO communication that have the specified RU allocation. As the RU allocation for the N_STA wireless devices is specified in a common field 602, the control information element 300A does not include RU allocation fields 306 in the respective user specific fields 306(1) to 306(P).

In a first example embodiment that uses non-self-contained control information element 300A, each of the electronic devices 106(1) to 106(N) includes a version of spatial configuration table 120 stored in a respective local storage medium, and the spatial stream allocation indicator 308 in each user specific field 306(1) to 306(P) will include the corresponding four-bit spatial configuration index from spatial index table column 206 (rather than a 2-bit value indicating a number of spatial streams).

In such cases, in block 506 of FIG. 5, the receiving electronic device 106($i$) will decode the common field 602 of control information element 300A to identify the RU allocation and the total number of electronic devices in the MU-MIMO communication that have the same RU allocation, enabling the receiving electronic device 106($i$) to determine the value of N-STA to map to the appropriate spatial configuration table part 204(2) to 204(8) of the spatial configuration table 120. The receiving electronic device 106($i$) recovers its respective spatial stream allocation indicator 308 from its corresponding user specific field 306($j$), which identifies a 4-bit spatial stream configuration index for index column 206 of spatial configuration table 120. Based on the recovered N_STA and spatial stream configuration index values, MU-MIMO communication engine 114 of electronic device 106($i$) can determine its respective spatial stream allocation from spatial configuration table 120.

By way of example, with reference to spatial configuration table 120, in the specific case a spatial stream allocation index "1001" for N_STA=3, the SS allocation indicator 308 in binary in each of the respective user-specific fields 306(1), 306(2), 306(3) corresponding to the three electronic devices 106(1), 106(2) and 106(3) having the same RU allocation will be "1001", "1001, "1001". Upon determining that the number of electronic devices specified in control information element 300 is 3 (e.g., N_STA=3), and that the SS allocation indicator 308 in user specific field 306(3) is "1001", an electronic device 106(3) will determine based on spatial configuration table 120 that its respective spatial stream allocation is spatial streams 9 to 12.

A second example embodiment of non-self-contained control information element 300A is similar to the first example embodiment described above, except that the SS allocation indicator 308, takes the same format as described above in respect of self-contained control information element 300. In particular, the SS allocation indicator 300 in the second example embodiment of non-self-contained control information element 300A is only two-bits in length and specifies the number (e.g. two to four) of spatial streams allocated to the respective electronic device 106(i) identified by the device identifier 304 of the user specific fields 306(j). Based on the information included in common fields 602 about RU allocation and number of user devices that have the RU allocation, and the 2-bit spatial stream allocation indicators included in the user specific fields, a receiving electronic device 106(i) can infer the specific 2 to 4 spatial streams that have been sequentially allocated to it among the possible 16 spatial streams, without requiring a locally stored spatial configuration table 120. It may allow to leave out the need to indicate the beginning stream and (or) the ending stream of each MU-MIMO scheduled STA in SS Allocation sub-field of each user specific field in EHT-SIG, because it is obvious through the RU allocation in the common information field to imply how many user specific fields are MU-MIMO scheduled together.

A storage medium (e.g., 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first wireless device comprising:
a network interface to communicate using up to 16 spatial streams in a wireless network with wireless devices; and
at least one processor operatively connected to the network interface and configured to send a control information element to a plurality of the wireless devices, that specifies, for each of the plurality of the wireless devices, a respective allocation of a minimum of two to a maximum of four spatial streams from the 16 spatial streams, based on a 4-bit spatial configuration index in the control information element that maps to a respective spatial configuration of the 16 spatial streams in a spatial configuration table, wherein different values of the 4-bit spatial configuration index map to different spatial configurations in the spatial configuration table that correspond to different allocations of the 16 spatial streams.

2. The first wireless device of claim 1 wherein the control information element includes, for each of the plurality of the wireless devices: a resource unit allocation indicator that indicates a resource unit allocation for the wireless device, and a spatial stream allocation indicator that indicates a number of the spatial streams allocated to the wireless device.

3. The first wireless device of claim 2, wherein the control information element includes, for each of the plurality of the wireless devices, a respective user specific field, the user specific field for each wireless device comprising: a wireless device identifier that identifies the wireless device, the resource unit allocation indicator for the wireless device, and the spatial stream allocation indicator for the wireless device.

4. The first wireless device of claim 2 wherein the spatial stream allocation indicator has a length of 2 bits.

5. The first wireless device of claim 1, further comprising:
a non-transitory storage medium to store the spatial configuration table, wherein the spatial configurations are represented by different entries of the spatial configuration table.

6. The first wireless device of claim 1, wherein the control information element is part of a preamble of a physical data unit.

7. The first wireless device of claim 1, wherein the control information element is part of a signal (SIG) field in a physical header of a wireless local area network (WLAN) frame.

8. The first wireless device of claim 1, wherein the first wireless device is an access point (AP).

9. The first wireless device of claim 1, wherein the network interface is configured to perform multi-user multiple-input and multiple-output (MU-MIMO) communications using up to the 16 spatial streams.

10. The first wireless device of claim 1 wherein the control information element includes a common field that includes a resource unit allocation indicator that indicates a resource unit allocation for the plurality of wireless devices and a device number indicator that indicates the number of the plurality of wireless devices; and the control information element includes, for each of the wireless devices, a respective device specific field that includes a spatial stream allocation indicator for the wireless device.

11. The first wireless device of claim 10, wherein the spatial stream allocation indicator indicates a number of spatial streams allocated for the wireless device.

12. The first wireless device of claim 11 wherein the spatial stream allocation indicator has a length of 2 bits.

13. The first wireless device of claim 1, wherein limiting the allocation of spatial streams to a minimum of two spatial streams from the 16 spatial streams causes an overhead consumed by the spatial allocation table to be reduced.

14. A method of a first wireless device comprising:
communicating with up to four wireless devices using up to 16 spatial streams in a wireless network, wherein each of the wireless devices is allocated a minimum of two to a maximum of four spatial streams; and sending a control information element to a plurality of the wireless devices that specifies, for each of the plurality of the wireless devices, a respective allocation of a minimum of two to a maximum of four spatial streams from the 16 spatial streams, based on a 4-bit spatial configuration index in the control information element that maps to a respective spatial configuration of the 16 spatial streams in a spatial configuration table, wherein different values of the 4-bit spatial configuration index map to different spatial configurations in the spatial configuration table that correspond to different allocations of the 16 spatial streams.

15. The method of claim 14 wherein the control information element includes, for each of the plurality of the wireless devices: a resource unit allocation indicator that indicates a resource unit allocation for the wireless device, and a spatial stream allocation indicator that indicates a number of the spatial streams allocated to the wireless device.

16. The method of claim 15, wherein the control information element includes, for each of the plurality of the wireless devices, a respective user specific field, the user specific field for each wireless device comprising: a wireless device identifier that identifies the wireless device, the resource unit allocation indicator for the wireless device, and the spatial stream allocation indicator for the wireless device.

17. The method of claim 15 wherein the spatial stream allocation indicator has a length of 2 bits.

18. The method of claim 14, further comprising:
storing the spatial configuration table in a non-transitory storage medium of the first wireless device, wherein the spatial configurations are represented by different entries of the spatial configuration table.

19. The method of claim 14 wherein the control information element is part of a signal (SIG) field in a physical header of a wireless local area network (WLAN) frame.

20. The method of claim 14, wherein limiting the allocation of spatial streams to a minimum of two spatial streams from the 16 spatial streams causes an overhead consumed by the spatial allocation table to be reduced.

* * * * *